INVENTORS
ALEX E. MAGALIK AND
GABRIEL J. JACOMINI

By Percy Freeman
Attorney

United States Patent Office 2,782,671
Patented Feb. 26, 1957

2,782,671

MECHANICAL VALVE FOR AN ACCORDION REED

Alexander E. Magalik, Flushing, and Gabriel J. Jacomini, Queens Village, N. Y.

Application March 2, 1953, Serial No. 339,510

7 Claims. (Cl. 84—360)

This invention relates to accordion reeds and more particularly to a mechanical valve for accordion reeds.

Accordion reeds are conventionally provided with soft leather flaps which serve as closures. They are actuated by the air currents and pressures which are set up under the compression and suction strokes of the accordion bellows. Thus, some of these leather flaps will close under the pressure of the compression stroke and they will open under the suction of the suction stroke; the rest of the leather flaps will open under the pressure of the compression stroke and they will close under the suction of the suction stroke. The flaps are passive in action since they do not possess the inherent tendency or urge necessary to move them or flex them into closed position. An external force must be applied to the flaps both to move or flex them into closed position and to move or flex them into open position. Consequently, whatever time lag there happens to be between the compression and suction strokes of the accordion bellows would be reflected in a corresponding time lag between the opening and closing movements of the flaps. Indeed, there would be an even greater time lag in the opening and closing movements of the flaps since a brief time interval would necessarily have to transpire between the action of the bellows and the reaction of the flaps.

It is accordingly the principal object of this invention to provide a valve flap for an accordion reed, which flap is spring-urged into closed position. In this invention the valve flap is provided with a spring which normally urges the flap into and maintains it in closed position. Consequently, the compression and suction forces which the accordion bellows generate during the course of a performance are not required for the purpose of closing the valve flaps. There is therefore a saving in the energy required to actuate the bellows, but more important is the fact that the flaps close automatically and virtually instantaneously after the notes or reeds to which they are related are sounded or played. There is no lag in time between the compression and suction notes of the accordion which is normally occasioned by reason of the fact that the bellows must first close the valve flaps on the one side of the reed block before the reeds on the opposite side of the reed block will function. In the present invention, the valve flaps automatically and instantaneously close at virtually precisely the moment that they are no longer required to be in open position, and this irrespective of whether the bellows are engaged in their compression stroke or their suction stroke or whether they are in transition from either of said strokes to the other.

Another important object of this invention is the provision of a valve flap of the character described which is made of light metal and which is provided with a soft leather or felt or other suitable facing or padding for sealing purposes. The metal, preferably aluminum or magnesium, gives body to the flap and enables it to retain its shape virtually indefinitely. Conventional valve flaps lose their shape and efficiency as a consequence of their use over various periods of time and replacement is therefore required from time to time. In the present invention, the metal valve flaps herein claimed last indefinitely, but should replacement become necessary, the flaps may be replaced.

It is a further object of this invention to provide a two-piece valve flap of the character described, wherein one piece is permanently mounted on the reed block and the other piece is hingedly and removably secured to the first piece. The permanently fastened piece need never be replaced, but even here, should replacement be necessary, it could be had. There are several forms to the present invention, but in one preferred form the movable flap member may very readily be removed and replaced without any disturbance whatsoever to the permanently secured flap member. In this preferred form of the invention, the movable flap member is provided with pintles which ride in open bearings on the fixed flap member. A leaf spring engages between the fixed and movable flap members and said spring performs two basic functions: In the first place, it acts to prevent the movable flap member from disengaging its pintles from the bearings of the fixed flap member. In the second place, it tends to urge the movable flap member into closed position. It will, of course, be understood that this arrangement of pintles and bearings may be reversed without departing from the principles of this invention. Thus, the fixed flap member may be provided with pintles and the movable flap member may be provided with inverted open bearings for said pintles.

Preferred forms of this invention are shown in the accompanying drawing in which.

Figure 1:
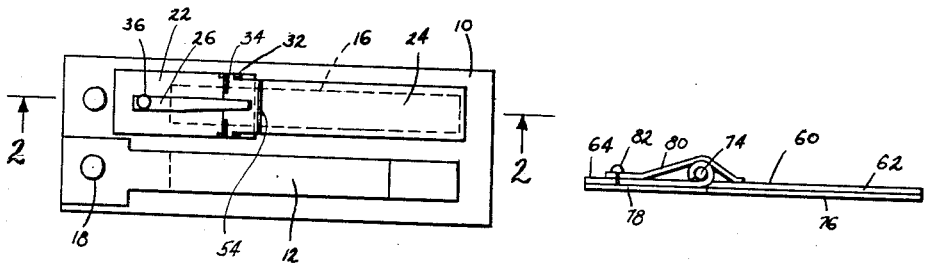
Fig. 1 is a plan view of a reed plate on which a valve flap made in accordance with one form of this invention is mounted.
Figures 2, 5, 6:
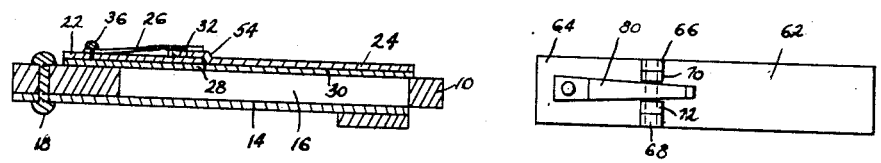
Fig. 2 is a sectional view on the line 2—2 of Fig. 1, showing the details of construction of said valve flap and how it is mounted on the reed plate.
Fig. 5 is a side view of a valve flap made in accordance with a third form of this invention.
Fig. 6 is a top view thereof.

Referring now to the first form of this invention and to Figs. 1 and 2 of the drawing, it will be seen that a conventional reed plate 10 is provided with a conventional reed or tongue 12 on one side thereof and a similar reed or tongue 14 on the opposite side thereof. The usual valve openings 16 are provided in the reed plate, one opening for each reed or tongue. These reeds or tongues are secured to the reed plate by means of rivets 18 or by any other suitable means.

Opposite each reed or tongue is a valve closure member 20. This valve closure member consists of the following component parts: a fixed plate 22, a hinged flap 24, a leaf spring 26, a pad 28 for plate 22, and a pad 30 for flap 24. The two pads 28 and 30 are cemented or otherwise secured to plate 22 and flap 24 respectively. Pad 28 is cemented or otherwise secured to the reed plate 10 and it is in this manner and by this means that valve plate 22 is secured to said reed plate. An air-tight seal is thereby provided between valve plate 22 and reed plate 10 and in this connection it will be noted that valve plate 22 extends across a portion of valve opening 16.

Valve flap 24 is cemented to padding 30 and it is this padding which provides a tight seal between said flap 24 and the valve plate 10. Valve plate 22 and movable valve flap 24 are both made of light sheet metal, preferably aluminum or magnesium. Plate 22 may be slightly thicker or heavier than flap 24 since the difference in weight would not much matter insofar as plate 22 is concerned for the reason that it is fixed in place on plate 10. Flap 24, on the other hand, should be extremely light in weight since it is the movable member of the valve closure and the lighter it is the more efficiently will it perform. The two pads 28 and 30 may be made of any suitable material such as soft leather, felt or the like.

Plate 22 is provided with a pair of open bearings 32 which receive pintles 34 formed on flap 24. These open bearings may simply be a pair of U-shaped lugs or ears struck up from the sides of plate 24 or they may be made and provided in any other suitable manner. Pintles 34 may also be provided in the form of a pair of arcuate ears or lugs struck out from the sides of flap 24 and projecting laterally outwardly therefrom on a common axis. Since bearings 32 are open, pintles 34 may be inserted therein and removed therefrom without any difficulty whatsoever. Flap 24 is accordingly adapted to pivot about the axis of its pintles 34 both inwardly into engagement with valve plate 10 to close the valve or reed opening 16 and outwardly away from said reed plate to open said valve or reed opening 16.

Leaf spring 26 is secured at one end to valve plate 22 by means of pin or rivet 36. It is free at its opposite end and its said free end bears against flap 24 to urge it into and maintain it in closed position. The spring also prevents accidental dislodgment of said flap 24 from bearings 32 which normally support pintles 34 of said flap. The leaf spring is relatively weak so as to provide very little resistance to the opening movement of said flap 24.

Figures 3, 7:
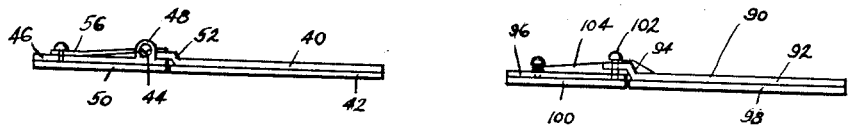
Fig. 3 is a side view of a slightly modified form of valve flap.
Fig. 7 is a side view of a valve flap made in accordance with a fourth form of this invention.
Figures 4, 8:
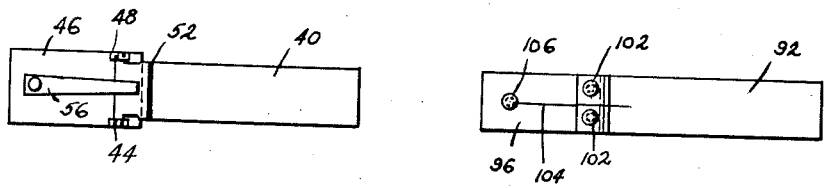
Fig. 4 is a top view of the valve flap shown in Fig. 3.
Fig. 8 is a top view thereof.

Flap 40 shown in Figs. 3 and 4 is identical in construction with flap 24 shown in Figs. 1 and 2. It is provided with the same kind of padding 42 and it may be mounted on the same reed plate. It is provided with pintles 44 which may be made precisely like the pintles 34 of flap 24. Valve plate 46 may be made like valve plate 22 with the sole exception that its bearings 48 are closed whereas bearings 32 are open. The same padding 50 is applied to plate 46 as to plate 22. Flap 40 is provided with an offset portion 52 which enables its hinged end to overlap plate 46 and which enables its padded portion to lie on a common plane with plate 46. Flap 24 is also provided with an offset portion 54 which performs the same function.

Since bearings 48 are closed, it is not possible to detach flap 40 from plate 46 with the same ease that flap 24 is detached from plate 22. Consequently, it may be said that for all practical purposes, there is a permanent hinge connection between flap 40 and plate 46. Actually, however, the bearings are simply ears formed at the sides of said plate and said bearings may be bent out of engagement with the pintles on said flap so as to free the flap from the plate. Like the first closure member above described, the one shown in Figs. 3 and 4 is provided with a leaf spring 56 to urge the flap into closed position.

Turning now to Figs. 5 and 6 and to the third form of this invention, it will be noted that valve closure member 60 corresponds, essentially, to the valve closure members above described but the hinge construction which joins flap 62 with plate 64 differs from the hinge constructions shown in Figs. 1 to 4 inclusive. Plate 64 is provided with a pair of loops 66 and 68 which serve as bearings and flap 62 is also provided with a pair of loops 70 and 72 which also serve as bearings, loops 70 and 72 being situated between loops 66 and 68, all of said loops being adapted to be aligned with each other and to receive a common pin 74. This pin serves as a pintle and loops 66, 68, 70 and 72 serve as hinge members which cooperate with said pintle to pivotally secure flap 62 to plate 64. It will be noted that the flap and the plate are both adapted to occupy a common horizontal plane when the flap is in closed position. Said flap and said plate are both provided with suitable padding, namely, pads 76 and 78 respectively.

A leaf spring 80 is provided on plate 64 and it will be noted that it is secured at one end to said plate by means of pin or rivet 82 and that it is free at its opposite end. Said free end projects between loops 70 and 72 and engages flap 62. The action is the same as has above been described with respect to springs 26 and 56.

Closure member 90 shown in Figs. 7 and 8 is similar to the closure members above described except that it is provided with a different type of hinge construction and with a different type of spring. Flap 92 has an offset portion 94 which overlaps plate 96. A suitable pad 98 is secured to flap 92 and a suitable pad 100 is secured to plate 96. A pair of headed pins 102 is secured to plate 96 and it will be understood that these pins project through a pair of relatively large holes formed in offset portion 94 of flap 92. There is also a spaced distance between the heads of said pins and said offset portion 94 of flap 92. Consequently, flap 92 is free to pivot relative to plate 96 to a limited extent but that limited extent is sufficient for the purposes of the present invention.

A wire spring 104 is secured at one end to plate 96 by means of pin or rivet 106. The free end of wire spring 104 projects between pins 102 and it engages flap 92 to urge said flap into and to maintain said flap in closed position.

The foregoing illustrates preferred forms of this invention and it will be understood that these preferred forms may be modified and other preferred forms may be provided within the broad principles of the invention and the broad scope and coverage of the claims.

We claim:

1. An accordion reed plate having two air passages formed therein, a vibrating tongue mounted on one side of said plate opposite one of said air passages, a second vibrating tongue mounted on the opposite side of said plate opposite the second air passage, and a pair of valve plates mounted on said reed plate, one on each side thereof and opposite said air passages and vibrating tongues, a closure flap pivotally mounted on each said valve plate for movement into and out of closed position against said accordion reed plate and relative to the air passage situated opposite thereto, and a spring connected between said valve plate and each said closure flap to urge said flap into closed position against said accordion reed plate and relative to the air passage situated opposite thereto.

2. A valve closure member in accordance with claim 1, wherein each valve plate and each closure flap are provided with padding on the sides facing the accordion reed plate to provide an airtight seal between said valve plate and said accordion reed plate and between the closure flap when said flap is in closed position and said accordion reed plate.

3. A valve closure member in accordance with claim 1, wherein each valve plate is provided with bearings and each closure flap is provided with pintles which are journaled into said bearings in order to pivotally support said closure flap on said valve plate.

4. A valve closure member in accordance with claim 1, wherein the pivotal connection between each closure flap and its valve plate consists of a pair of bearings on one of said members and a pair of pintles on the other of said members, said pintles being journaled into said bearings.

5. A valve closure member in accordance with claim 1, wherein the pivotal connection between each closure flap member and its corresponding valve plate member comprises a pair of open bearings on one of said members and a pair of pintles on the other of said members, said pintles being journaled into said bearings, the spring being secured at one end to the member on which the bearings are provided and bearing at its opposite end against the member on which the pintles are provided, whereby the action of the spring upon the member on which the pintles are provided tends to prevent accidental dislodgment of said pintles from said bearings.

6. A valve closure member in accordance with claim 1, wherein the pivotal connection between each closure flap and its corresponding valve plate comprises a pair of hinge members on the closure flap and a pair of cooperative hinge members on the valve plate and a pintle interengaging said hinge members of said valve plate and said closure flap.

7. A valve closure member in accordance with claim 1, wherein the pivotal connection between each closure flap and its corresponding valve plate comprises a pair of headed pins secured to the valve plate and projecting through relatively large holes formed in the closure flap, the heads of said pins being situated a spaced distance from said closure flap to permit of relative pivotal movement between said closure flap and said valve plate.

References Cited in the file of this patent

UNITED STATES PATENTS

| | | |
|---|---|---|
| 517,648 | Galleazzi | Apr. 3, 1894 |
| 2,149,434 | Guidobaldi | Mar. 7, 1939 |
| 2,603,822 | Evans | July 22, 1952 |
| 2,640,384 | Miessner | June 2, 1953 |

FOREIGN PATENTS

| | | |
|---|---|---|
| 691,598 | Germany | May 31, 1940 |